3,522,968
GLARE SHIELD ATTACHMENT FOR AUTOMOBILE
SUN VISORS
Murel E. Honor, Sr., 11721 Woodward Ave.,
Detroit, Mich. 48203
Filed Nov. 18, 1968, Ser. No. 776,598
Int. Cl. B60j 3/02
U.S. Cl. 296—97          3 Claims

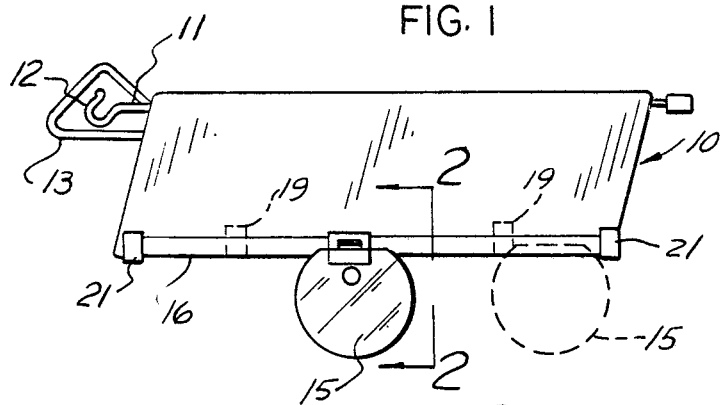
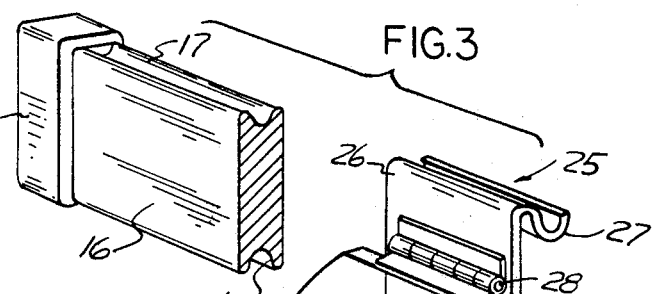
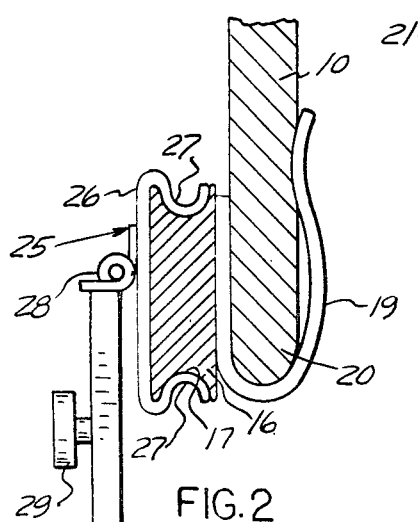
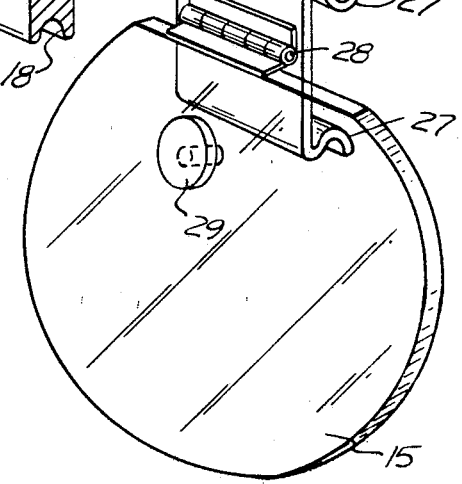
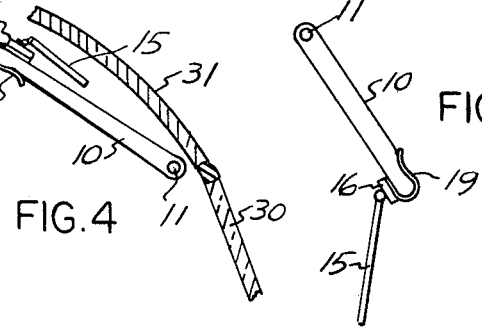
INVENTOR
MUREL E. HONOR, SR.
BY Cullen, Sloman, & Cantor
ATTORNEYS

United States Patent Office 3,522,968
Patented Aug. 4, 1970

ABSTRACT OF THE DISCLOSURE

For adjustably securing a glare shield to a conventional automobile sun visor, a long, narrow strip fastened to the lower edge of the visor, with a U-shaped clip gripping the upper and lower edges of the strip and slidably mounted upon the strip, and a glare shield hingedly fastened to the clip.

BACKGROUND OF INVENTION

Automobile sun visors conventionally comprise a flat panel mounted above the windshield, within the automobile, and function to block off the glare of the sun coming through the windshield. At times, the angle of the sun is such that the glare avoids or passes the sun visor and thus, various types of glare shields have been proposed in the past for attachment to the sun visor and for blocking off the rays of the sun which by-pass the visor.

Prior glare shields have comprised small size substantially transparent panels formed of a type of material which reduces glare. These have been adjustably secured to the sun visors in various way, but usually requiring some considerable hand manipulation for adjustments relative to the visor.

Since the driver of an automobile is already well occupied, it is important that he be able to adjust the glare shield into whatever position necessary with a minimum of effort and attentiveness. Hence, prior mechanisms for attaching the glare shield to the sun visor have been deficient in that they have required considerable care and mechanical manipulation and the application of some force for securing the glare shield in the desired position.

Hence, this invention is concerned with a glare shield mounting attachment which can be easily manipulated, with minimum effort and attentiveness, and which will remain in its set position for as long as desired, without the need for the application of mechanical forces, such as the tightening of a fastener or the like.

SUMMARY OF INVENTION

In summary, this invention contemplates mounting a thin, flat, horizontally arranged strip upon the lower edge of a conventional sun visor and securing a glare shield thereto by means of a U-shaped springy clip abutting the strip with its legs spring pressing against the upper and lower edges of the strip for thereby slidably mounting the clip upon the strip so that the shield may be horizontally moved and will remain in position once set.

Thus, an object of this invention is to provide a simplified mounting means for the glare shield in the form of an elongated horizontally arranged strip whose upper and lower edges are channeled with a U-shaped clip slidably mounted upon the strip and having its legs snugly and spring fitted into the channels, with the glare shield hingedly connected to the clip so that it will hang vertically despite the sun visor being arranged at an angle and so that it may be lifted over the upper face of the visor when the visor is swung into its upward non-use position.

These and other objects and advantages of this invention will become apparent upon reading the following description, of which the attached drawings form a part.

DESCRIPTION OF DRAWINGS

FIG. 1 is an elevational view of a conventional automobile sun visor with the glare shield attachment secured thereto.

FIG. 2 is an enlarged cross-sectional view taken in the direction of arrows 2—2 of FIG. 1.

FIG. 3 is an enlarged, perspective view of the glare shield and mounting attachment.

FIG. 4 is a side view of the visor shown in its upward, non-use position, and

FIG. 5 shows the visor swung into a non-vertical, forward use position.

DETAILED DESCRIPTION

FIG. 1 illustrates a conventional auto sun visor 10 which is mounted upon a support bar 11 having an end 12 secured to a bracket 13 which is fastened within the automobile, above the windshield and in front of the driver. This is all conventional construction.

Mounted upon the visor is a glare shield 15, preferably formed of a substantially transparent material suitably tinted to reduce glare. The shield is intended to be movable along the horizontal lower edge of the visor and pivotal relative to the lower edge of the visor.

The attachment herein includes a horizontally elongated, thin, narrow strip 16, preferably formed of a plastic material. Its upper and lower edges are formed, in cross-section into concave channels 17 and 18, which extend the full length of the strip.

The strip is removably fastened to the visor by means of U-shaped springy clips 19 which embrace and frictionally grasp the lower edge 20 of the visor.

In addition, end caps 21 are preferably provided upon the opposite ends of the strip these being formed of a resilient rubbery material and function as a bumper means to avoid injury due to contact with the ends of the strip as well as to finish the appearance of the strip.

Mounted upon the strip is a U-shaped, springy slider 25. The slider is preferably formed of a springy metal or plastic sheet material bent into a flat base portion 26 arranged to abut in face to face contact, the exposed face of the strip 16. The legs 27 of the slider are curved into complementary forms to snugly fit within the grooves 17 and 18. Thus, the slider embraces the strip and its legs grip against the upper and lower edges of the strip, but being of a springy material, the slider may be easily slid along the length of the strip and will remain wherever positioned until manually moved again.

Secured to the flat base portion 26 is a conventional hinge 28, in turn fastened to the upper edge of the glare shield 15 so that the shield may pivot relative to the slider and strip. In addition, a grasping handle 29 may be secured upon the glare shield for more easily grasping and moving the combination of the shield and slider upon the strip. In operation, when assembled as illustrated in FIG. 1, the glare shield may be horizontally moved along the length of the strip to whatever position may be needed. When the visor is not needed at all, it may be swung into its upward or non-use position (see FIG. 4) where it is adjacent the roof 31 of the automobile and above the windshield 30. Here, the glare shield may be swung over the top face of the visor so that it is out of the way and inconspicuous.

Where the visor is in a use, as shown in FIG. 5, despite the angular adjustment of the visor relative to the windshield, the glare shield 15 will hang vertically due to the hinge connection with the slider.

This invention may be further developed within the scope of the following claims. Accordingly, it is desired that the foregoing description be read as being merely illustrative of an operative embodiment of this invention and not in a strictly limited sense.

Having fully described an operative embodiment of this invention, I now claim:

1. A glare shield attachment for an automobile sun visor, comprising:

a horizontally elongated, narrow, thin strip having its upper and lower edges concavely grooved for the full length thereof;

means for removably fastening the strip upon the lower edge of said visor;

a springy U-shaped slider clip having a flat base engaged in face to face contact with the strip, and legs bent into curves closely corresponding to the shape of the grooves of the strip and fitted therein for spring gripping the edges of the strip and for horizontally slidably mounting the clip upon the strip;

a normally vertically arranged glare shield panel having its upper edge fastened by means of a hinge to said clip;

whereby said shield may be horizontally moved and held in predetermined positions upon the strip and the shield may hang vertically despite the visor being non-vertically arranged.

2. A construction as defined in claim 1, and said hinge being fastened to the exposed face of the flat base of the clip approximately midway between its upper and lower edges for positioning the shield upper edge in overlapping relationship to the lower portion of said flat base.

3. A construction as defined in claim 1, and said means for fastening the strip to the visor comprising U-shaped springy clips each shaped to receive and grip the lower edge of the visor and fastened to the strip.

References Cited

UNITED STATES PATENTS

| 2,941,389 | 5/1960 | Pendlebury | 296—97 |
| 3,336,073 | 8/1967 | Berger | 296—97 |

LEO FRIAGLIA, Primary Examiner

J. A. PEKAR, Assistant Examiner

U.S. Cl. X.R.

248—286